United States Patent [19]

Granzow et al.

[11] Patent Number: 4,580,040

[45] Date of Patent: Apr. 1, 1986

[54] TELLER-ASSISTED, CUSTOMER-OPERATED ATM CHECK CASHING SYSTEM

[75] Inventors: Robert H. Granzow, Miamisburg; Kimbrough I. Myers, Kettering; Mark D. Filliman, Beavercreek, all of Ohio

[73] Assignee: NCR Corporation, Dayton, Ohio

[21] Appl. No.: 538,718

[22] Filed: Oct. 3, 1983

[51] Int. Cl.$^4$ .............................................. G06F 15/30
[52] U.S. Cl. .................................................... 235/379
[58] Field of Search ................................. 235/379, 475

[56] References Cited

U.S. PATENT DOCUMENTS

| | | | |
|---|---|---|---|
| 3,876,864 | 4/1975 | Clark et al. | 235/61.7 B |
| 3,949,364 | 4/1976 | Clark et al. | 340/147 A |
| 4,027,142 | 5/1977 | Paup | 235/475 |
| 4,109,238 | 8/1978 | Creekmore | 340/149 A |
| 4,187,498 | 2/1980 | Creekmore | 340/149 A |
| 4,205,780 | 6/1980 | Burns et al. | 235/454 |
| 4,264,808 | 4/1981 | Owens et al. | 235/379 |

Primary Examiner—Harold I. Pitts
Attorney, Agent, or Firm—Albert L. Sessler, Jr.; Elmer Wargo

[57] ABSTRACT

A system of cashing checks which utilizes a customer-operated, automatic teller machine (ATM) in cooperation with a teller at a teller station. A document transport within the ATM is used to deliver the check and identification media to the teller. Data entered by the customer and MICR data read from the check are used to access stored data which is displayed at the teller station to assist the teller in evaluating the customer and the negotiability of the check. Upon a satisfactory evaluation, the teller actuates a function key at the teller station which enables the ATM to dispense the currency to the customer.

13 Claims, 8 Drawing Figures

TELLER-ASSISTED, CUSTOMER-OPERATED ATM CHECK CASHING SYSTEM

BACKGROUND OF THE INVENTION

This invention relates generally to automated banking systems, and more particularly, it relates to a system of cashing checks, which system utilizes a customer-operated, automated teller machine (ATM) in cooperation with equipment at a teller station where a human teller also participates in the evaluation of the customer attempting to cash a check and the check itself.

There have been extended efforts in the last decade, for example, to automate banking operations. The ATM mentioned is a prime example of the results of these efforts. The ATM performs the functions of dispensing cash, receiving deposits, transferring funds from savings to checking accounts, for example. One of the functions which ATMs do not generally perform is that of cashing checks.

In general, about 35% of a human teller's transactions at a typical bank amount to cashing checks. A typical ATM which is capable of performing the various functions mentioned, can perform about 63% of the usual functions performed by a human teller; this does not include the cashing of checks.

SUMMARY OF THE INVENTION

In contrast with the above, an ATM in combination with a teller station and a human teller, according to this invention, can handle about 90% of transactions encountered by a human teller instead of the 63% mentioned.

The check cashing system according to this invention comprises a machine for performing financial transactions including the dispensing of cash; said machine having means for identifying a user of said machine, means for entering data about a check to be cashed, and means for receiving documents including a check to be cashed; a teller station; transport means for transporting documents including a check received at said receiving means to said teller station; evaluating means at said teller station to assist a teller at said teller station in evaluating said check and said user; said evaluating means including a display and a keyboard including function keys thereon; and means for coupling said machine with said evaluating means to enable data entered at said machine to be displayed at said display and to initiate the dispensing of cash from said machine in response to an actuation of a selected one of said function keys upon a satisfactory evaluation of said check and said user.

The system of this invention is simple in construction and inexpensive to implement.

These advantages and others will be more readily understood in connection with the following specification, claims, and drawing.

DETAILED DESCRIPTION OF THE INVENTION

Figure 1:
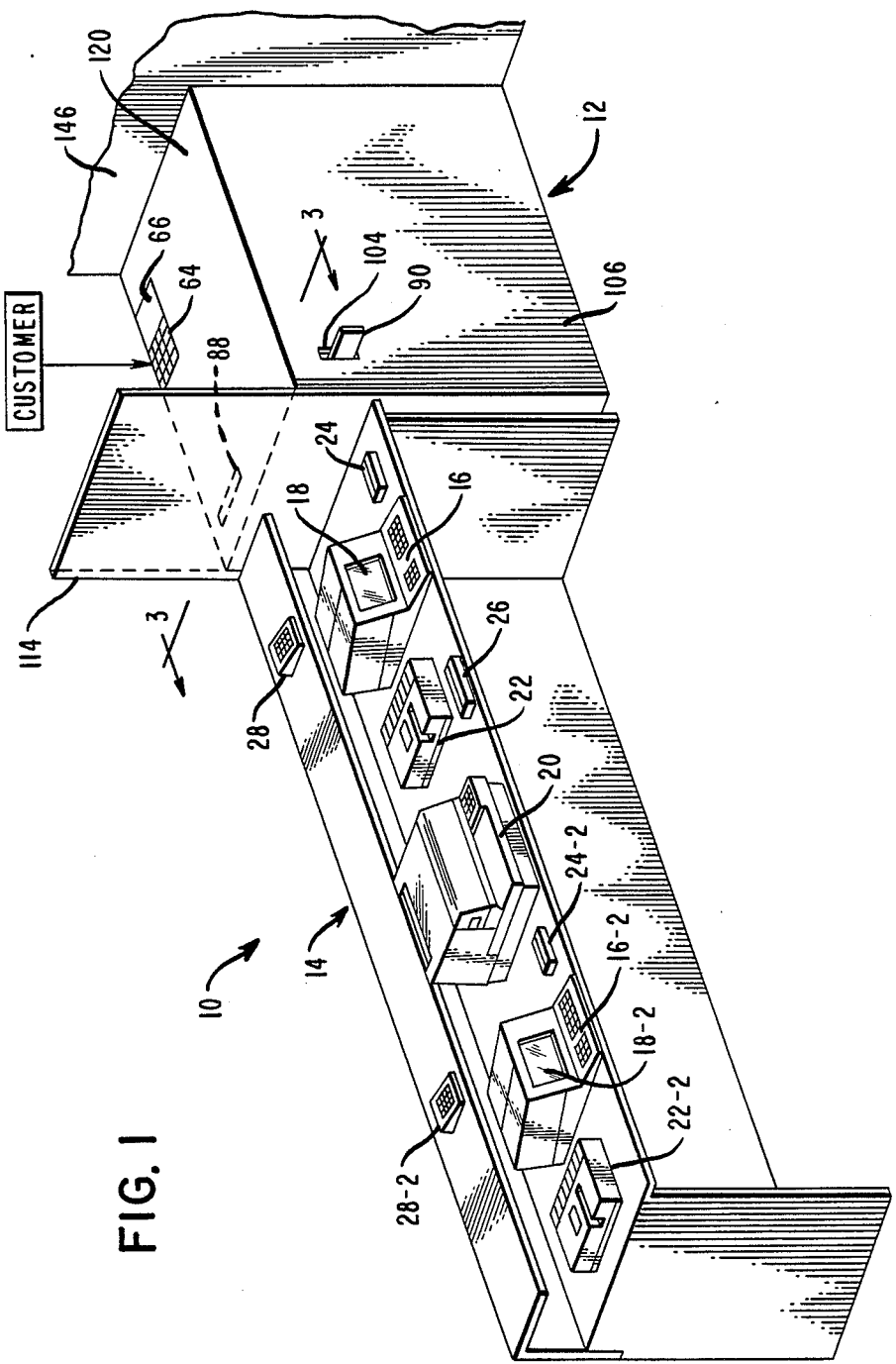
FIG. 1 is a general view, in perspective, showing the apparatus of a preferred embodiment of this invention, which includes, generally, a modified ATM and a group of business machines commonly referred to as a teller station.

FIG. 1 is a general view, in perspective, of the system 10 of cashing checks according to a preferred embodiment of the invention, showing a modified automated teller machine ATM 12 and a group of financial machines commonly referred to as a teller station 14. The ATM 12 is operated by a customer and the teller station 14 is operated by a human teller; however, the ATM 12 and the teller station 14 are coupled together as will be described hereinafter, and the teller exerts some control over the ATM 12 which is normally independently operated by a customer. Before describing the operation of the system 10 in detail, it appears appropriate to discuss the components thereof.

The system 10 includes the teller station 14 which is conventional, such as the NCR 5000 system. The teller station 14 includes: a keyboard 16 such as an NCR 5012-K041 for entering data; a display 18 such as an NCR 5012 which includes a cathode ray tube (CRT) for communicating with a teller; a passbook printer 20 such as an NCR 5022 for printing on passbooks to record deposits to or withdrawals from savings accounts, for example; a journal/voucher printer 22 such as an NCR 5021 for printing on deposit slips, for example; a magnetic stripe or card reader 24 such as an NCR 5012-K080 for reading magnetic strips on cards such as bank identification cards; a conventional magnetic ink character recognition (MICR) reader 26 for reading MICR data on checks, for example; and a pin pad 28 such as an NCR 5012-K020 to enable a customer to enter certain data, such as a secret identification number.

The teller station 14 (FIG. 1) also includes duplicate equipment such as keyboard 16-2, display 18-2, J/V printer 22-2, card reader 24-2, and pin pad 28-2 for a second teller located at the station 14; this duplicate equipment is identical to that already described. For example, keyboard 16-2 is identical to keyboard 16. In the particular embodiment described, the passbook printer 20 is shared by two tellers, although this need not necessarily be so. All the equipment described with an NCR prefix is manufactured by and currently available from the NCR Corporation of Dayton, Ohio.

Figure 2:
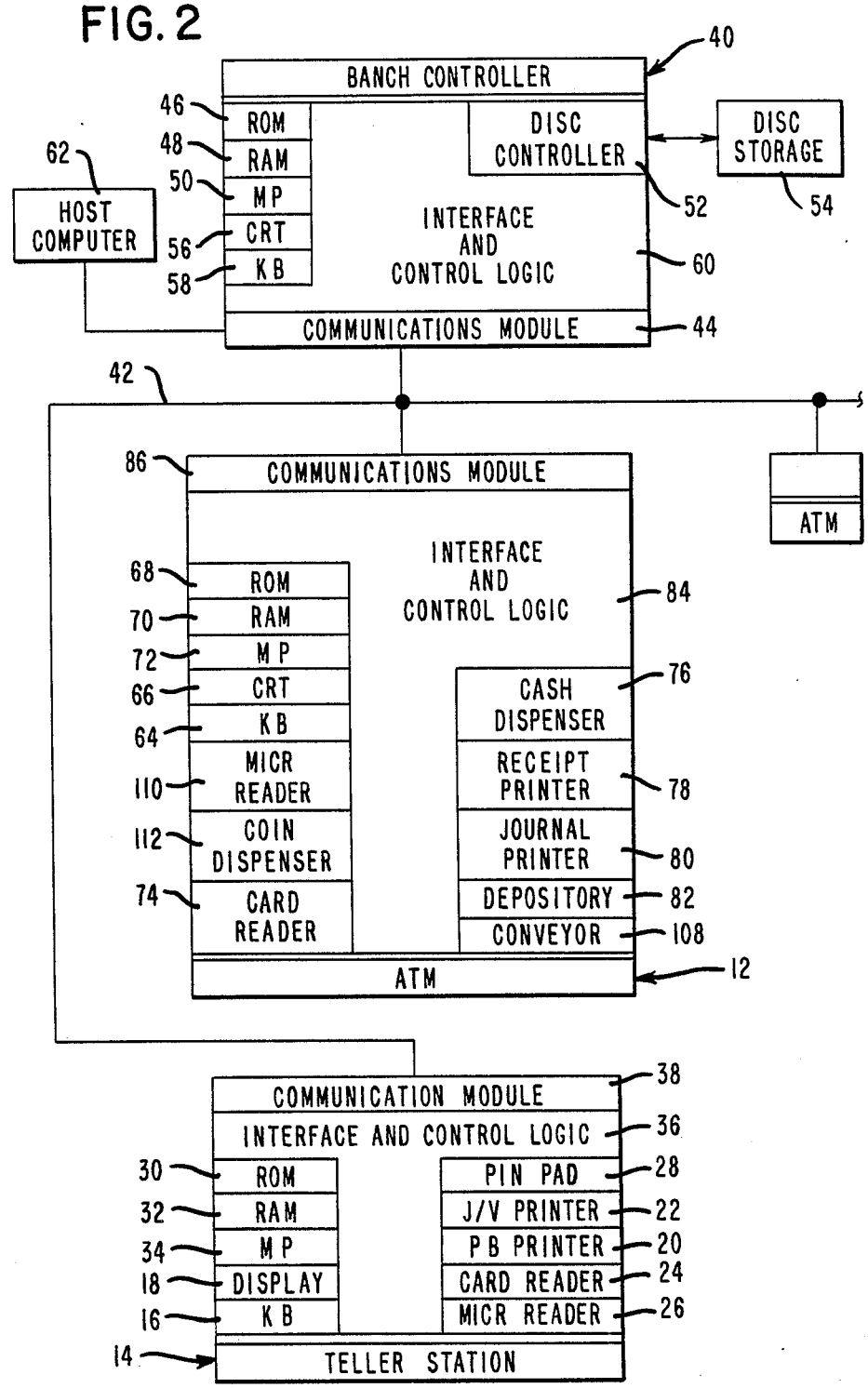
FIG. 2 is a general schematic view showing how the ATM and the teller station shown in FIG. 1 are connected.

The teller station 14 also includes: a read only memory (ROM) 30 (FIG. 2) for storing certain instructions; a random access memory (RAM) 32 for temporary memory storage; a processor (MP) 34 for executing the instructions; interface and control logic 36 for interconnecting the various elements associated with the teller station 14, shown in FIG. 2; and a communication module 38 to enable the teller station 14 to communicate with the branch controller 40 over a communication link 42. The communication module 38, for example, is standard such as the 28530 Integrated Circuit which is available from Zilog Corporation. The communication link 42 is conventional such as the NCR In-House DLS which is a high speed, synchronous, communications format type, and used with the communication module 38, for example. The branch controller 40 is conventional such as an NCR 5094 processor or controller which is available from NCR Corporation. The controller 40 includes a communication module 44 (coupled to the communications link 42) by which it communicates with the teller station 14 and the ATM 12; because this aspect is conventional and not important to an understanding of this invention, it is not described in any further detail.

In general, the controller 40 contains the application programs for the various general functions performed by the teller station 14. In this regard, the controller 40 includes a ROM 46 where certain programs or procedures may be stored, a RAM 48 for providing temporary storage for processing data or for storing application programs, and a processor (MP) 50 for executing the instructions and application programs from the ROM 46 or RAM 48. The controller 40 also includes a disc controller 52 which is coupled to the disc storage 54 where extensive data storage may be had. In the embodiment described, the disc storage 54 contains, for example, a data base associated with the bank's customers. The data base may include current monetary balances for the various account numbers, names and addresses of account holders, and personal identification numbers (PIN)s associated with the various account numbers, to name just a few of the types of data included in the data base. The controller 40 also includes a display such as a CRT 56, a keyboard (KB) 58 for manually entering data, and interface and control logic 60 which provide the various connections for the elements shown. The controller 40 may also be connected or coupled to a host computer 62 via the communication module 44.

The ATM 12 (FIG. 2) includes: a keyboard 64 for entering data; a display such as CRT 66 for communicating with a customer; a ROM 68 where instructions and routines are stored; a RAM 70 for providing temporary storage; a processor (MP) 72 for executing the instructions; a card reader 74 for reading identification cards associated with the operation of an ATM, a cash dispenser 76 for dispensing bills or currency; a receipt printer 78 for printing receipts to be given to a customer when a deposit, for example, is made using the ATM 12; a journal printer 80 for printing a list of transactions occurring at the ATM 12; a depository 82 for receiving deposit envelopes when deposits are made; interface and control logic 84 for connecting the various components shown in FIG. 2; and a communication module 86 for coupling the ATM 12 to the teller station 14 and the branch controller 40 via the communications link 42.

As previously stated, the ATM 12 is conventional and may be an NCR 1770 ATM which is modified as will be described hereinafter. The ATM 12 is of the type which is mounted inside a bank for use by customers during banking hours. What has been described so far in relation to ATM 12 is included in the standard NCR 1770 ATM mentioned which is modified as shown best in relation to FIG. 3.

Figure 3:
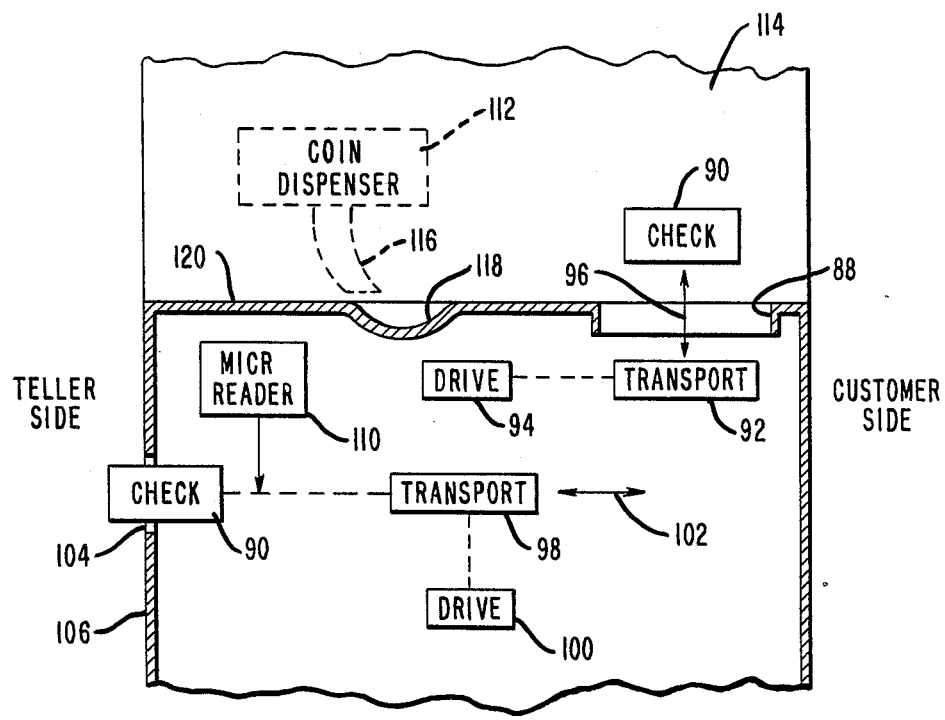
FIG. 3 is a cross-sectional view, taken along the line 2—2 of FIG. 1 to show details of a means for transporting a check to be cashed through the ATM.

FIG. 3 is a cross-sectional view, taken generally along the line 3—3 of FIG. 1, to show additional details of the modified ATM 12 as used in the system 10. The ATM 12 includes a receiving slot 88 into which a check 90 to be cashed is inserted. As the check 90 is lowered into the slot 88, it is received by a conventional transport 92 which is driven by a drive 94. The transport 92 includes endless belts (not shown) between which the check is moved. The drive 94, which includes a reversible motor (not shown), is operatively coupled to the transport 92 to move a check 90 in the directions of double arrow 96.

A second, conventional, transport 98 (FIG. 3) is also included in the ATM 12 along with a second drive 100. The transport 98 includes pairs of endless belts to sandwich the check 90 therebetween, and the drive 100 includes a reversible motor (not shown) which is operatively coupled to the transport 98 to move a check 90 in the direction of double arrow 102.

The function of the transports 92 and 98 is to transport a check 90 which is deposited by a customer into receiving slot 88 and transfer it to the slot 104 in the side wall 106 of the ATM 12 where the check 90 can be grasped by a teller located at the teller station 14. The teller then grasps the check 90 and performs certain evaluations in conjunction with the teller station 14 and the ATM 12 as will be described hereinafter. If the check 90 is to be cashed, it is retained by the teller. If the check 90 is not to be cashed, it is returned to the customer via the transports 98 and 92. In order to monitor the movement of a check 90 within the ATM 12, there are position sensors (not shown) associated with the transports 92 and 92, and a conventional conveyor control routine 108 (FIG. 2) is used to control the drives 94 and 100 which move the check 90 from the slot 88 to the slot 104 and vice versa.

The ATM 12 is also modified to include a MICR reader 110 (FIG. 3) which is positioned operatively with respect to the transport 98 so as to enable the reader 110 to read the MICR data (account #, for example) on check 90 as it is moved thereby. Instructions on the CRT 66 of the ATM 12 instruct a customer as to how and when to insert the check 90 to be cashed into the receiving slot 88. In some situations in which a customer's signature is not in an electronic file, for example, additional identification such as a driver's license or a separate credit card may be required of a customer wishing to cash a check 90. In such situations, the additional identification is placed in the slot 88 after the check 90 is deposited therein in response to the appropriate instructions on the CRT 66.

A typical ATM in use today generally dispenses only currency, with the sums requested during a cash dispensing operation being for units of currency but no coins. It is very likely that a check 90 to be cashed will be written for an amount requiring the dispensing of coins. In order to accommodate this function, the ATM 12 is provided with a conventional coin dispenser 112 (FIG. 3) which is under the control of the ATM 12. The coin dispenser 112 is located on the teller's side of the panel 114 (FIG. 1) which separates the ATM 12 from the teller station 14. A delivery chute 116 (FIG. 3) which passes through the panel 114 is used to deliver the coins (by gravity) to a collecting basin 118 located in the top panel 120 of the ATM 12, from which basin 118 the coins can be picked up by a customer. The currency or bills for the check being cashed are delivered to the customer by the usual cash dispenser 76 (FIG. 2) associated with the ATM 12. The cash dispenser 76 may be modified to dispense higher-denomination bills to accommodate the check cashing function because a typical ATM generally has a relatively low-limit for a typical cash dispensing operation. Another feature of this invention is that any change or coins which are due a customer as a result of a check-cashing operation may be simply added to the customer's account via the ATM 12.

Having discussed the apparatus used in the system 10, it appears appropriate to discuss a typical check-cashing operation by a customer at the ATM 12. When a customer wishes to use an ATM, he takes part in a customer identification procedure which is fairly standardized today; consequently it is shown only as a single step 120 in FIG. 4. The ATM 12, through its CRT 66, provides the various lead-through instructions, informing the customer to insert his personal identification card (containing his account number, for example), and to enter at a separate time on the keyboard 64, his personal identification number (PIN). At step 122, the personal identification card and the PIN are compared, and if there is a satisfactory evaluation, the check-cashing process proceeds to step 124. The evaluation step 122 includes utilizing the output of card reader 74 (from the identification card) to access the customer's account data from the disc storage 54, for example. The customer's account data also has his PIN which is compared with the PIN which the customer entered on the keyboard 66. If the evaluation at step 122 indicates a difference between the customer's card-identification number and his PIN, a reject procedure at step 126 is initiated. Typically, the identification card is returned to the customer, and if the customer fails to identify himself in three tries at the ATM 12, his identification card is captured and retained in the ATM 12.

Figure 4:
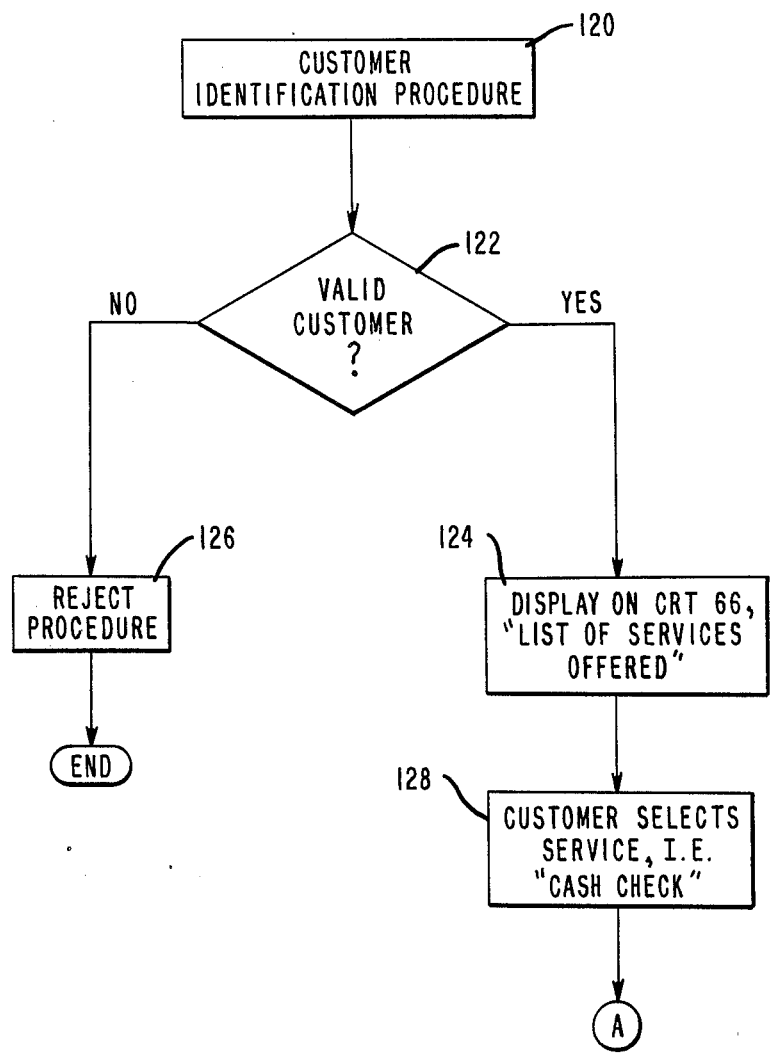
FIG. 4 is a process chart showing various initial steps in a check-cashing operation.

Assuming the customer is a valid one, at step 124 in FIG. 4 the ATM 12 will display on its CRT 66 a "menu" or "list" of services which are offered by the ATM 12. The list of services may include cash dispensing, receiving deposits, transferring funds from one account to another for typical ATM functions. With the present system 10, the additional service of cashing checks is provided. When a customer wishes to cash a check, he selects that function at step 128 in FIG. 4 by actuating a function key on the keyboard 64.

Figure 5:
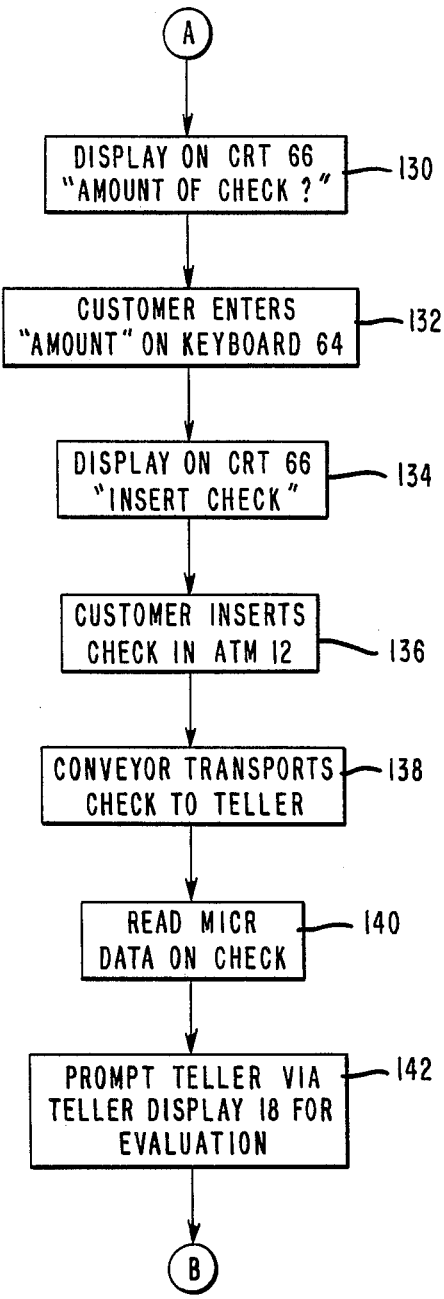
FIG. 5 is a process chart showing additional steps in the check-cashing operation shown partially in FIG. 4.

From step 128 in FIG. 4, the check-cashing operation proceeds to step 130 in FIG. 5, at which step the CRT 66 requests the monetary amount of the check to be cashed. As previously stated, the application programs may reside in the branch controller 40, and conventional communication techniques are employed to transfer data between the branch controller 40 and the ATM 12. In response to step 130, the customer enters the monetary amount of the check to be cashed on the keyboard 64 as shown at step 132 in FIG. 5. When the check amount is entered, the amount is displayed on the CRT 66 of the ATM 12 so that the customer can check his entry, and the CRT 66 also displays the request instructing the customer to "Insert Check" as shown at step 134 in FIG. 5. In response thereto, the customer inserts his check 90 (facing a prescribed way) into the receiving slot 88 as shown at step 136. The conveyor control routine 108 is then activated to control the transporting of the check 90 from the slot 88 (FIG. 3) to the slot 104 where the teller at teller station 14 can grasp it as represented by step 138 in FIG. 5. In travelling from the slot 88 to the slot 104, the check 90 is transferred from the transport 92 to the transport 98 which moves the check in reading relationship with the MICR reader 110 to read the MICR data on the check as shown at step 140. The MICR data read on a check 90 includes, among other data, the account number for the drawer of the check. If the drawer of the check 90 also has his checking account at the bank associated with the system 10, the balance of the drawer's checking account is accessed from disc storage 54 via the branch controller 40 and displayed on the display 18 at the teller station 14. Having the checking account balance of the drawer of the check to be cashed assists the teller in making an evaluation of the check. A less-automated but cheaper way of obtaining the drawer's checking account balance which is on file in system 10 is to utilize the MICR reader 26 (FIG. 1) at the teller station 14. After the teller receives the check 90 from the slot 104 in the ATM 12, a modified routine 108 would instruct the teller via the display 18 to pass the check 90 through the MICR reader 26 to obtain the account number from the check, which enables the system to provide the associated checking balance. The routine 108 also includes messages on the display 18 to prompt the teller to evaluate the check 90 being processed by the ATM 12 as shown at step 142. It should also be pointed out that while the teller is cooperating with the ATM 12 to assist in a check-cashing function, the teller is also servicing customers at the teller station 14 in the usual person-to-person way. In this regard, the display 18 at the teller station 14 may have a separate area reserved for displaying messages and data associated with the check-cashing function being carried on by the teller in association with the ATM 12 so as to avoid contention problems for the display requirements associated with the teller station 14.

Figure 6:
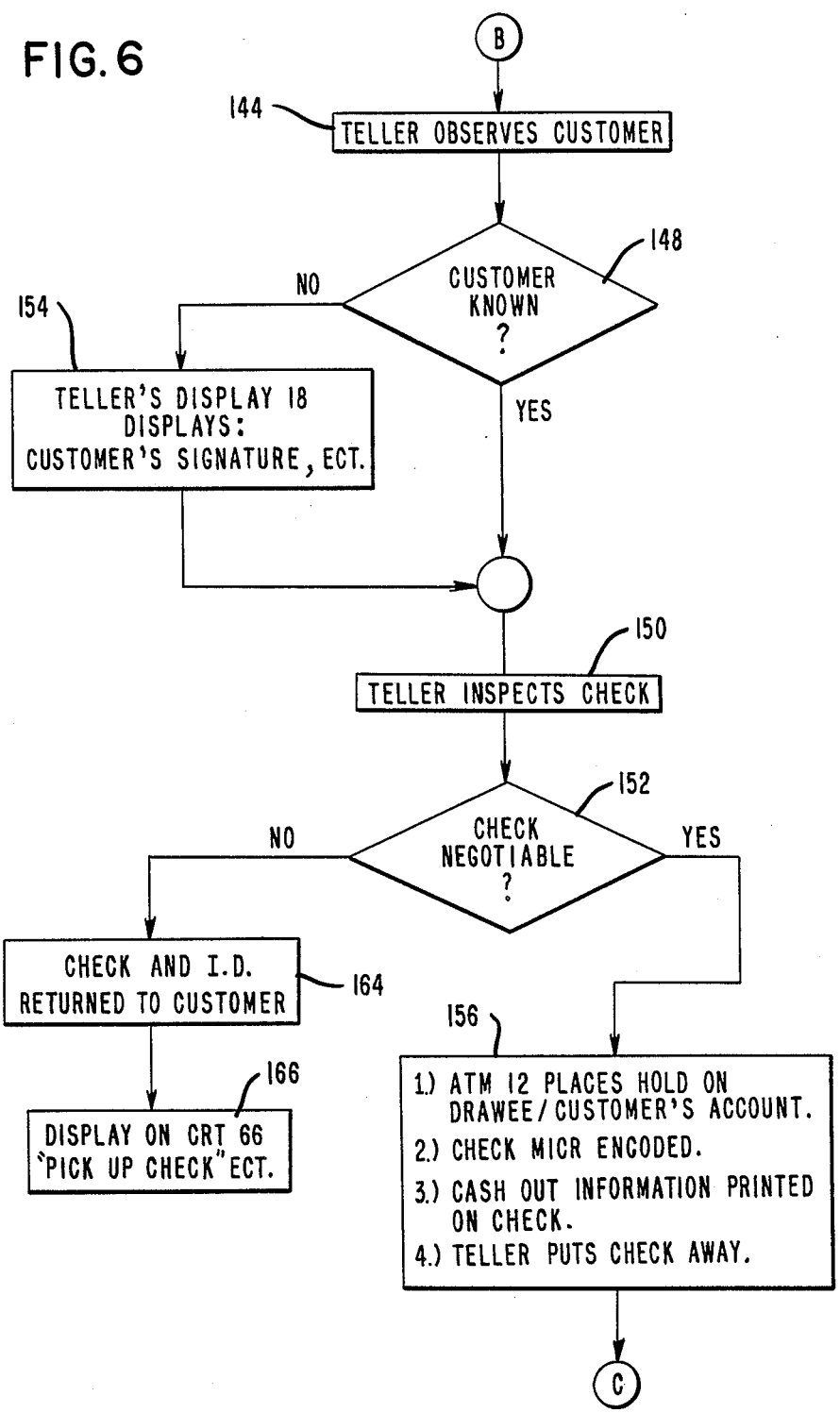
FIG. 6 is a process chart which represents a continuation of the check-cashing operation shown partially in FIG. 5.

In response to the prompting from step 142 in FIG. 5, the teller at the teller station 14 observes the customer attempting to cash a check 90 at the ATM 12 as shown by step 144 in FIG. 6. To facilitate this observation, the panel 114, in the preferred embodiment, is a one-way mirror to enable the teller at the teller station 14 to look at the customer at the ATM 12 and not vice versa. It was felt that having the ATM 12 isolated from the teller station 14 by the panel 114 and the wall 146 (FIG. 1) would encourage customers to use the ATM 12 instead of using the teller station 14; this is especially true when long customer lines exist at the teller station 14.

At step 148 in FIG. 6, the teller looks at the customer at the ATM 12 to determine whether or not the customer is known to the teller. If the customer is known, the teller inspects the check 90 at step 150 to determine whether or not the check is negotiable. In this regard, the date, endorsement, drawer's signature, etc. are evaluated. If the particular check 90 being evaluated is also drawn on the same bank at which it is being cashed, the teller can also look at the display 18 to obtain the current balance of the drawer of the check. This added data can help the teller decide at step 152 whether or not the check 90 is negotiable.

If, at step 148 in FIG. 6, the customer is not known to the teller, the teller performs certain additional functions at step 154. In this regard, the means for transporting a check 90 through the ATM 12, which means includes the transports 92 and 98 (FIG. 3), can also be used to transport an additional identification item like a driver's license to the teller at the teller station 14. With the driver's license, for example, the teller can check the customer's signature, picture, and overall description. As an alternative, the teller checks the drawee-customer's signature by having an image thereof displayed on the display 18. In this regard, the system 10 may include the electronic file alluded to earlier herein in which digitized data corresponding to the authorized signatures for the associated accounts at the bank are stored. Two systems for developing digitized data from the images of checks are shown in U.S. Pat. Nos. 4,205,780 and 4,264,808, for example. The digitized data corresponding to the signatures may be stored, for example, in disc storage (not shown but similar to disc storage 54) by account number. This digitized signature data for the drawee of the check being cashed is accessed by the account number which is obtained from the identification card entered into the card reader 74 of the ATM 12 as previously described. The digitized signature data for the drawer of the check being cashed in the example described is also accessed by account number, but the account number is obtained from the MICR reader 110 in the ATM 12 or the MICR reader 26 located at the teller station 14 as previously described. The signature of the drawee or drawer of the check being cashed or both is/are displayed upon the display 18 during step 154 in FIG. 6. The display 18 may be of the high resolution type when digitized signature data is to be displayed in the system 10. This signature data enables the teller at the teller station 14 to identify the customer (step 154) and also enables the teller to decide whether or not the check is negotiable as at step 152 in FIG. 6.

If the check 90 is considered negotiable by the teller at step 152 in FIG. 6, the teller actuates a function key located on the keyboard 16 to "dispense cash" as represented by step 156 in FIG. 6. This actuation initiates several activities depending upon the level of sophistication or number of features included in a particular system 10. For example, because the drawee's account number and the amount of the check being cashed are known, a hold may be placed on the drawee customer's account for the amount of the check cashed; this is useful for checks which are cashed in the system 10 but drawn on other banks. Because the monetary amount of the check 90 is entered into the system 10 by the customer at the keyboard 64 and this amount is checked by the teller at the teller station 14, the monetary amount of the check may be MICR encoded on the check itself by the teller placing the check in the J/V printer 22. At the same printing operation, a transaction number generated at the ATM 12 during the check-cashing operation, and any cash-out or similar banking information required are printed on the check to provide an audit trail for the particular check cashed. The teller then places this check cashed in a pile to keep it separate from the checks which he cashes via the teller station 14 alone.

Figure 7:
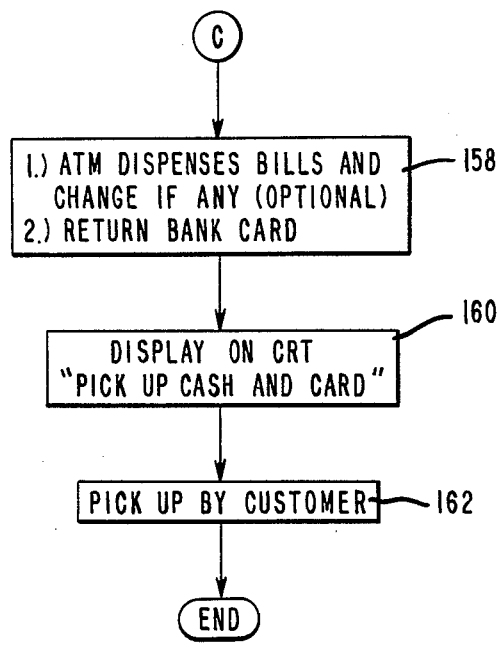
FIG. 7 is a process chart which represents a continuation of the check cashing operation shown partially in FIG. 6.

Continuing with the activities resulting from an actuation of the function key, "dispense cash" shown as step 156 in FIG. 6; at step 158 in FIG. 7, the ATM 12 will dispense the bills or currency associated with the monetary amount of the check, and if a coin dispenser 112 is also employed in the system 10, it will dispense any coins necessary for the non-currency or "change" portion of the monetary amount as previously described. If the system 10 does not dispense coins, the "change" portion of the monetary amount is credited to the drawee customer's account. If any identification card in addition to that used to operate the ATM 12 is used as part of the evaluation procedure associated with step 154 (FIG. 6), it is returned to the customer via a "return" function key on the keyboard 16 which initiates a routine in the ATM 12 to reverse the drives 94 and 100 to return the identification card placed in the slot 104 to the customer at the ATM 12. In addition, the CRT 66 on the ATM 12 displays the request, "Pick up cash and card" as shown at step 160. The customer then picks up the cash dispensed and any card or cards as shown at step 162. At the conclusion of step 162, the ATM 12 notifies the branch controller 40 that a check cashing operation has been successfully completed to thereby clear out the transaction from the branch controller 40.

Returning to step 152 in FIG. 6, if the check 90 is considered non-negotiable by the teller, the teller actuates a function key, "Do not cash" on the keyboard 16. Actuation of this "Do not cash" key will actuate the conveyor control routine 108 to energize the drives 94 and 100 to operate in reverse. The teller then places the check 90 and identification card (if any used) in the slot 104 of the ATM 12 for return to the customer as shown by step 164 in FIG. 6. The ATM 12 will then inform the customer via the CRT 66 to pick up the check, cards, etc. as shown at step 166. Actuation of the "Do not cash" function key on the keyboard 16 is used to clear the transaction from the branch controller 40.

Figure 8:
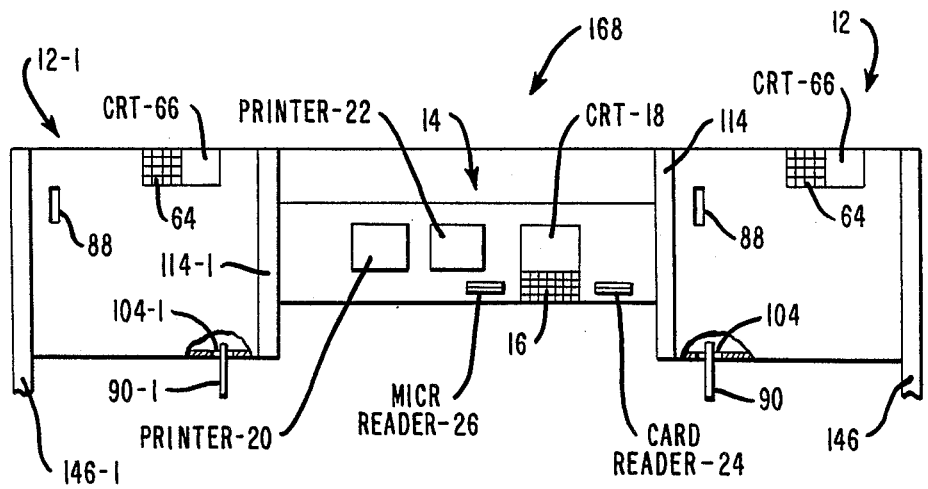
FIG. 8 is a plan view, in diagrammatic form, of a second embodiment of this invention which enables a teller at a teller station to monitor two ATMs.

FIG. 8 shows a plan view, in diagrammatic form, of a second embodiment of this invention which is designated as system 168. The system 168 is designed to enable a teller at teller station 14 to monitor two ATMs, namely 12 and 12-1, while still performing the usual person-to-person transactions associated with the teller station 14 as previously explained. ATM 12-1 is identical to ATM 12 already described with one exception. That exception relates to a relocation of the discharge slot 104 and the transport 98 (FIG. 3) which moves a check from transport 92 to the slot 104. The discharge slot 104 in ATM 12 is located near the left side of the machine as viewed in FIG. 8, and the discharge slot 104-1 associated with the ATM 12-1 is located near the right side of the machine to enable a check 90-1 transported through the slot 104-1 to be readily grasped by the teller at the teller station 14. The teller station 14 includes the various pieces of equipment shown in FIG. 1, and the same reference numerals used in FIG. 1 are used in FIG. 8 for identical pieces of equipment.

The teller monitors the ATMs 12 and 12-1 and cooperates with them as previously explained. The checks entered in each of the ATMs 12 and 12-1 are kept in separate piles, however, to provide the necessary audit trails.

What is claimed is:
1. A check cashing system comprising:
a machine for performing financial transactions including the dispensing of cash; said machine having means for identifying a user of said machine, means for entering data about a check to be cashed, and means for receiving documents including a check to be cashed;
a teller station;
transport means for transporting documents including a check received at said receiving means to said teller station;
evaluating means at said teller station to assist a teller at said teller station in evaluating said check and said user; said evaluating means including a display and a keyboard including function keys thereon; and
means for coupling said machine with said evaluating means to enable data entered at said machine to be displayed at said display and to initiate the dispensing of cash from said machine in response to an actuation of a selected one of said function keys upon a satisfactory evaluation of said check and said user.

2. The system as claimed in claim 1 in which said system also includes means for reading data from a check to be cashed and means for coupling said reading means with said display at said teller station to enable data read from said check by said reading means to be displayed at said display at said teller station.

3. The system as claimed in claim 2 in which said transport means is located in said machine.

4. The system as claimed in claim 3 in which said reading means is located within said machine and cooperates with said transport means to read said data from a check to be cashed.

5. The system as claimed in claim 4 in which said evaluating means also includes a one-way mirror positioned between said machine and said teller station to enable said teller at said teller station to view a said user at said machine.

6. The system as claimed in claim 4 in which said machine includes a currency dispenser for dispensing the currency amount of a check being cashed, and said system also includes a coin dispenser for dispensing coins at said machine for the coin amount, if any, of a said check being cashed.

7. The system as claimed in claim 6 in which said transport means include reversible drives to enable said documents including a check received at said teller station to be returned to said user at said receiving means in response to an actuation of a second selected one of said function keys upon an unsatisfactory evaluation of said check and said user.

8. The system as claimed in claim 7 in which said teller station also includes a printer for printing on a said check at least some of said data entered at said machine including the monetary amount of the check to be cashed.

9. The system as claimed in claim 1 in which said system also includes means for storing data associated with users of said system and means for coupling said storing means with said machine and said evaluating means;

said system also including means for reading data from a check to be cashed so as to enable data associated with the drawer of said check to be cashed to be accessed from said storing means and also to be displayed at said display at said teller station.

10. The system as claimed in claim 9 in which said transport means is located in said machine and in which said reading means is located within said machine and cooperates with said transport means to read said data from a check to be cashed.

11. The system as claimed in claim 10 in which said machine includes a currency dispenser for dispensing the currency amount of a check being cashed, and said system also includes a coin dispenser for dispensing coins at said machine for the coin amount, if any, of a said check being cashed.

12. The system as claimed in claim 11 in which said transport means include reversible drives to enable said documents including a check received at said teller station to be returned to said user at said receiving means in response to an actuation of a second selected one of said function keys upon an unsatisfactory evaluation of said check and said user.

13. The system as claimed in claim 4 in which said evaluating means also includes a one-way mirror positioned between said machine and said teller station to enable said teller at said teller station to view a said user at said machine.

* * * * *